US010134226B2

(12) United States Patent
Keilwert

(10) Patent No.: US 10,134,226 B2
(45) Date of Patent: Nov. 20, 2018

(54) METHODS AND APPARATUS FOR CONTROLLING CASINO GAME MACHINES

(71) Applicant: IGT CANADA SOLUTIONS ULC, Moncton (CA)

(72) Inventor: Stefan Keilwert, Lannach (AT)

(73) Assignee: IGT CANADA SOLUTIONS ULC, Moncton (CA)

( * ) Notice: Subject to any disclaimer, the term of this patent is extended or adjusted under 35 U.S.C. 154(b) by 11 days.

(21) Appl. No.: 14/074,122

(22) Filed: Nov. 7, 2013

(65) Prior Publication Data

US 2015/0126268 A1 May 7, 2015

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2018.01) |
| ***G07F 17/32*** | (2006.01) |

(52) U.S. Cl.

CPC ........ *G07F 17/3227* (2013.01); *G07F 17/326* (2013.01); *G07F 17/3206* (2013.01); *G07F 17/3237* (2013.01)

(58) Field of Classification Search

USPC ...... 463/20, 23, 29, 36, 39, 41, 43; 600/300, 600/544, 546, 595; 434/128, 129

See application file for complete search history.

(56) References Cited

U.S. PATENT DOCUMENTS

| | | | |
|---|---|---|---|
| 4,934,378 A | 6/1990 | Perry, Jr. | |
| 5,318,295 A * | 6/1994 | Hofer | 463/7 |
| 5,362,049 A | 11/1994 | Hofer | |
| 7,774,052 B2 | 8/2010 | Burton et al. | |
| 8,157,730 B2 | 4/2012 | LeBoeuf et al. | |
| 8,160,689 B2 | 4/2012 | Jadidi | |
| 8,204,786 B2 | 6/2012 | LeBoeuf et al. | |
| 8,296,172 B2 | 10/2012 | Marci et al. | |
| 8,308,562 B2 | 11/2012 | Patton | |
| 8,392,253 B2 | 3/2013 | Pradeep et al. | |
| 8,409,024 B2 | 4/2013 | Marty et al. | |

(Continued)

FOREIGN PATENT DOCUMENTS

| | | |
|---|---|---|
| CN | 102065745 A | 5/2011 |
| DE | 4212907 A1 | 10/1993 |

(Continued)

*Primary Examiner* — Adetokunbo O Torimiro

(74) *Attorney, Agent, or Firm* — Sage Patent Group

(57) ABSTRACT

Techniques for controlling a casino game machine include detecting, via one or more muscle activity sensors worn by a player of a wagering game played on the casino game machine, voluntary muscle activity of the player while playing the wagering game on the casino game machine. The detected voluntary muscle activity of the player may be analyzed to infer a state of the player indicative of the player's level of interest while playing the wagering game. The inferred state of the player may be mapped to one or more game adjustments appropriate for increasing a likelihood that the player in the inferred state will continue to play the wagering game or another wagering game. The game adjustments may be applied by changing one or more operating parameters of the casino game machine controlling one or more aspects of the wagering game while the player is playing the wagering game.

34 Claims, 7 Drawing Sheets

(56) References Cited

U.S. PATENT DOCUMENTS

| | | | |
|---|---|---|---|
| 8,437,844 | B2 | 5/2013 | Syed Momen et al. |
| 2002/0077534 | A1* | 6/2002 | DuRousseau ................. 600/300 |
| 2004/0210159 | A1 | 10/2004 | Kibar |
| 2006/0149167 | A1* | 7/2006 | Yeh ........................ A61B 5/103 600/587 |
| 2006/0184059 | A1* | 8/2006 | Jadidi ........................... 600/546 |
| 2006/0281543 | A1* | 12/2006 | Sutton et al. ................... 463/29 |
| 2008/0146890 | A1 | 6/2008 | LeBoeuf et al. |
| 2008/0191864 | A1 | 8/2008 | Wolfson |
| 2008/0300055 | A1* | 12/2008 | Lutnick et al. ................. 463/39 |
| 2009/0005700 | A1 | 1/2009 | Joshi et al. |
| 2009/0270170 | A1* | 10/2009 | Patton ............................. 463/36 |
| 2009/0280899 | A1* | 11/2009 | Cox ........................ A63F 13/10 463/36 |
| 2010/0004977 | A1 | 1/2010 | Marci et al. |
| 2010/0160744 | A1 | 6/2010 | Ha et al. |
| 2010/0211439 | A1 | 8/2010 | Marci et al. |
| 2010/0266213 | A1* | 10/2010 | Hill .......................... A61B 5/16 382/218 |
| 2010/0304864 | A1 | 12/2010 | Johnson et al. |
| 2011/0098112 | A1 | 4/2011 | LeBoeuf et al. |
| 2011/0118619 | A1 | 5/2011 | Burton et al. |
| 2011/0125046 | A1 | 5/2011 | Burton et al. |
| 2011/0208753 | A1 | 8/2011 | Sivadas |
| 2012/0122592 | A1 | 5/2012 | Stafford et al. |
| 2012/0197737 | A1 | 8/2012 | LeBoeuf et al. |
| 2012/0203081 | A1 | 8/2012 | LeBoeuf et al. |
| 2012/0203133 | A1 | 8/2012 | Jadidi |
| 2012/0226111 | A1 | 9/2012 | LeBoeuf et al. |
| 2013/0046577 | A1 | 2/2013 | Marci |
| 2013/0095959 | A1 | 4/2013 | Marty et al. |
| 2013/0095961 | A1 | 4/2013 | Marty et al. |
| 2013/0130845 | A1 | 5/2013 | Marty et al. |
| 2015/0019135 | A1* | 1/2015 | Kacyvenski ......... A61B 5/0488 702/19 |

FOREIGN PATENT DOCUMENTS

| | | | |
|---|---|---|---|
| FR | 2608036 | A1 | 6/1988 |
| JP | 4771638 | | 5/2003 |
| JP | 2009116609 | A | 5/2009 |
| JP | 201082226 | A | 4/2010 |

* cited by examiner

METHODS AND APPARATUS FOR CONTROLLING CASINO GAME MACHINES

BACKGROUND

Modern casinos are increasingly moving toward electronic and computerized implementations for their gaming machines. For example, slot machines historically were mechanical devices whose physical reels could be spun by pulling a lever on the side of the machine. Each symbol on each reel occupied a physical stop having the same probability as all other stops on the reel, and the machine would pay out based on the combination of symbols appearing in a line across the reels (the “payline”) when all of the reels stopped spinning. Today, however, mechanical reels in slot machines are typically controlled electronically, such that different probabilities can be assigned to different symbols on the reels. The reels can be spun by pushing a button that activates the electronic control, although some machines may retain the traditional lever for entertainment value. In newer video slot machines, the physical reels are replaced by virtual reels whose symbols are displayed on a video screen, controlled by one or more computer processors. Some video slot machines have physical buttons for the player to press, while others are operated via touchscreen.

An electronic gaming machine is typically programmed, via software or firmware, to pay out as winnings, in the long run, a particular percentage of the money that is paid in by players as wagers. This is typically done by setting the probabilities for individual payouts in the machine’s control system. For example, if a machine gives a payout of 10 times the player’s wager with a probability of 5%, and a payout of 20 times the player’s wager with a probability of 2%, then the machine has a theoretical payout percentage of 90%. The remaining 10% of the wagers are kept by the “house” (i.e., the slot machine operator—typically the casino) as profits. The payouts that result from various combinations of symbols appearing on the payline when the reels stop spinning are typically listed in a pay table that may be displayed somewhere on the machine. The probability of each payout can thus be controlled by setting the probabilities of the individual symbols that must co-occur on the payline to produce that payout.

SUMMARY

One type of embodiment is directed to a method for controlling a casino game machine, the method comprising: detecting, via one or more muscle activity sensors worn by a player of a wagering game played on the casino game machine, voluntary muscle activity of the player while playing the wagering game on the casino game machine; analyzing the detected voluntary muscle activity of the player to infer a state of the player indicative of the player’s level of interest while playing the wagering game; mapping the inferred state of the player to one or more game adjustments appropriate for increasing a likelihood that the player in the inferred state will continue to play the wagering game or another wagering game; and applying the one or more game adjustments by changing one or more operating parameters of the casino game machine controlling one or more aspects of the wagering game while the player is playing the wagering game.

Another type of embodiment is directed to at least one processor-readable storage medium storing processor-executable instructions that, when executed by at least one processor, perform a method for controlling a casino game machine, the method comprising: detecting, via one or more muscle activity sensors worn by a player of a wagering game played on the casino game machine, voluntary muscle activity of the player while playing the wagering game on the casino game machine; analyzing the detected voluntary muscle activity of the player to infer a state of the player indicative of the player’s level of interest while playing the wagering game; mapping the inferred state of the player to one or more game adjustments appropriate for increasing a likelihood that the player in the inferred state will continue to play the wagering game or another wagering game; and applying the one or more game adjustments by changing one or more operating parameters of the casino game machine controlling one or more aspects of the wagering game while the player is playing the wagering game.

Another type of embodiment is directed to a casino game machine comprising at least one processor and at least one storage medium storing processor-executable instructions that, when executed by the at least one processor, perform a method for controlling the casino game machine, the method comprising: detecting, via one or more muscle activity sensors worn by a player of a wagering game played on the casino game machine, voluntary muscle activity of the player while playing the wagering game on the casino game machine; analyzing the detected voluntary muscle activity of the player to infer a state of the player indicative of the player’s level of interest while playing the wagering game; mapping the inferred state of the player to one or more game adjustments appropriate for increasing a likelihood that the player in the inferred state will continue to play the wagering game or another wagering game; and applying the one or more game adjustments by changing one or more operating parameters of the casino game machine controlling one or more aspects of the wagering game while the player is playing the wagering game.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
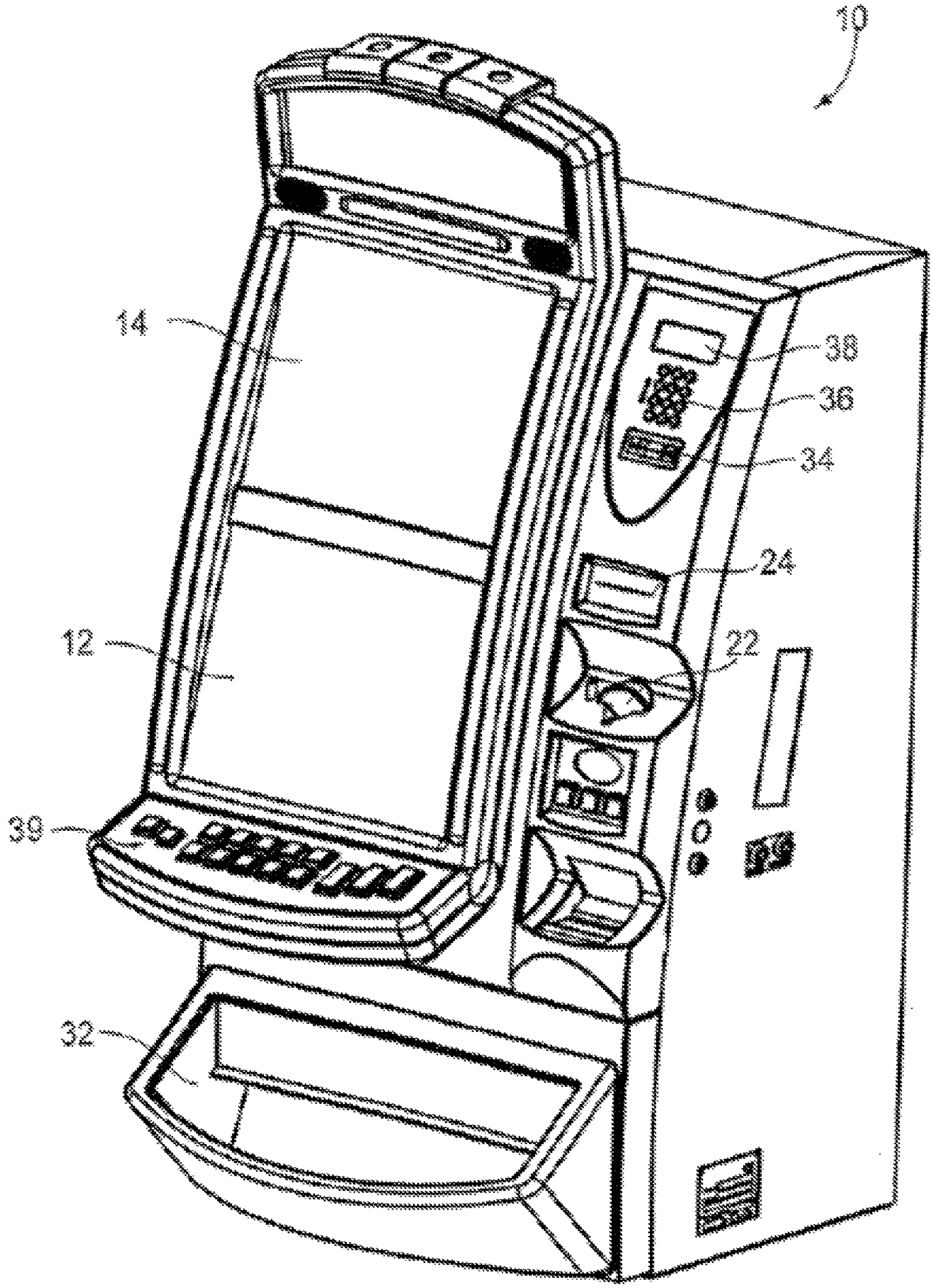
FIG. 1 illustrates an exemplary cabinet housing a casino game machine in accordance with some embodiments.

The inventors have appreciated that casino gambling is a risky and potentially discouraging activity for players, particularly if they realize that the odds in casino wagering games are typically set in favor of the house so that the casino can turn a profit. To overcome the natural tendency of many human beings to avoid risk, professionals in the gaming industry make a living out of designing games and game features that can capture and retain a player's interest and cause the player to have fun while wagering money in a casino. In addition, casino operators may invest significant resources into designing the environment and ambiance of the casino itself to keep players entertained and engaged.

The inventors have appreciated that the longer a player continues to play a casino wagering game or games, the more money the casino is likely to make from that player. It may be desirable, therefore, to adapt a casino game to recapture a player's interest when it may be waning, and/or to maintain or enhance the player's interest when the player is engaged and feeling entertained. To that end, the inventors have recognized that it may be advantageous to obtain one or more measurements from a player that may be indicative of the player's level of interest and/or engagement while playing a casino wagering game. The inventors have appreciated that when a state of the player indicative of the player's level of interest and/or engagement can be inferred from such measurements, this may allow one or more aspects of the game and/or the player's environment to be adjusted accordingly while the game play is in progress, in a manner calculated to keep the player engaged and playing longer. An example of a player's state indicative of the player's level of interest and/or engagement may be the player's emotional state while playing the wagering game. For example, when the wagering game is played on a casino game machine, one or more operating parameters of the casino game machine may be changed while the player is playing the game, to adjust the game to engage the interest of the player in his current emotional state.

The inventors have further recognized that it may be advantageous to obtain measurements that may be indicative of a player's emotional state or other type of state indicative of the player's level of interest and/or engagement in a way that is transparent to the player, so that the player may not necessarily realize that such measurements are being taken. For example, the inventors have appreciated that many players may be happy to allow a control device to take physiological measurements as a way of interacting with a game machine in an interesting way. The inventors have thus recognized that voluntary muscle activity of the player, such as may be used by the player to operate and control the game machine to play the game itself, may be advantageously used to convey information about the player's emotional state without impinging extraneously on the user's perception or gaming experience.

Accordingly, some embodiments described herein relate to techniques for controlling a casino game machine, which may address one or more of the above-discussed shortcomings of traditional methods, and/or that may provide one or more of the foregoing benefits. However, embodiments are not limited to any of these benefits, and it should be appreciated that some embodiments may not provide any of the above-discussed benefits and/or may not address any of the above-discussed deficiencies that the inventors have recognized in conventional techniques.

In some embodiments, a player of a wagering game played on a casino game machine may wear one or more muscle activity sensors which may detect the player's voluntary muscle activity. In some embodiments, the player may use the one or more muscle activity sensors to input commands to the casino game machine through voluntary muscle activity such as one or more control gestures. In some embodiments, voluntary muscle activity detected via the one or more sensors may be analyzed to infer the player's emotional state while playing the wagering game. For example, in some embodiments, the intensity of the player's muscle activity movements may be analyzed to determine whether the player is, e.g., currently excited or disinterested. In some embodiments, the player's inferred emotional state may be mapped to one or more game adjustments appropriate for increasing the likelihood that the player will continue to play the wagering game or another wagering game, and the one or more game adjustments may be applied while the player is playing the wagering game, by changing one or more operating parameters of the casino game machine.

It should be appreciated that the foregoing description is by way of example only, and embodiments are not limited to providing any or all of the above-described functionality, although some embodiments may provide some or all of the functionality described herein.

The embodiments described herein can be implemented in any of numerous ways, and are not limited to any particular implementation techniques. Thus, while examples of specific implementation techniques are described below, it should be appreciated that the examples are provided merely for purposes of illustration, and that other implementations are possible.

One illustrative application for the techniques described herein is for use in a system for controlling a casino game machine. However, techniques described herein may be applied to any type of gaming device, including but not limited to a casino game machine (e.g., a slot machine), a PC, a laptop, a tablet, a smartphone, glasses with augmented reality technology, etc.

An exemplary cabinet 10 housing a casino game machine is illustrated in perspective view in FIG. 1. Exemplary cabinet 10, as depicted in FIG. 1, includes a display 12 that may be a thin film transistor (TFT) display, a liquid crystal display (LCD), a cathode ray tube (CRT) display, a light-emitting diode (LED) display, an organic LED (OLED) display, an autostereoscopic three dimensional (3D) display, or any other type of display. A second display 14 may provide game data or other information in addition to display 12. Display 14 may provide static information, such as an advertisement for the game, the rules of the game, pay tables, pay lines, and/or other information, and/or may even display the main game or a bonus game along with display 12. Alternatively, the area for display 14 may be a display glass for conveying information about the game. Display 12 may also include a camera for use, for example, in presenting an autostereoscopic 3D display.

Display 12 and/or display 14 may have a touch screen lamination that includes a transparent grid of conductors. A player touching the screen may change the capacitance between the conductors, and thereby the X-Y location of the touch on the screen may be determined. A processor within cabinet 10 may associate this X-Y location with a function to be performed. There may be an upper and lower multi-touch screen in accordance with some embodiments.

A coin slot 22 may accept coins or tokens in one or more denominations to generate credits within the casino game machine for playing games. An input slot 24 for an optical reader and printer may receive machine readable printed tickets and may output printed tickets for use in cashless gaming.

A coin tray 32 may receive coins or tokens from a hopper (not shown) upon a win or upon the player cashing out.

However, in some embodiments, the casino game machine may not pay in cash, but may only issue a printed ticket for cashing in elsewhere. Alternatively, a stored value card may be loaded with credits based on a win, or may enable the assignment of credits to an account associated with a computer system, which may be a computer network-connected computer.

A card reader slot 34 may accept any of various types of cards, such as smart cards, magnetic strip cards, and/or other types of cards conveying machine readable information. The card reader may read the inserted card for player and/or credit information for cashless gaming. The card reader may read a magnetic code on a conventional player tracking card, where the code uniquely identifies the player to the host system. The code may be cross-referenced by the host system to any data related to the player, and such data may affect the games offered to the player by the casino game machine. The card reader may also include an optical reader and printer for reading and printing coded barcodes and other information on a paper ticket. A card may also include credentials that enable the host system to access one or more accounts associated with a user. The account may be debited based on wagers by a user and credited based on a win.

A keypad 36 may accept player input, such as a personal identification number (PIN) and/or any other player information. A display 38 above keypad 36 may display a menu for instructions and/or other information, and/or may provide visual feedback of the keys pressed. The keypad 36 may be an input device such as a touchscreen, or dynamic digital button panel, in accordance with some embodiments.

Player control buttons 39 may include any buttons and/or other controllers usable for the play of the particular game or games offered by the casino game machine, including, for example, a bet button, a repeat bet button, a spin reels (or play) button, a maximum bet button, a cash-out button, a display pay lines button, a display payout tables button, select icon buttons, and/or any other suitable button(s). In some embodiments, buttons 39 may be replaced by a touch screen with virtual buttons. In some embodiments, touchless control gesture functionality discussed below may replace or coexist with buttons 39.

Figure 2:
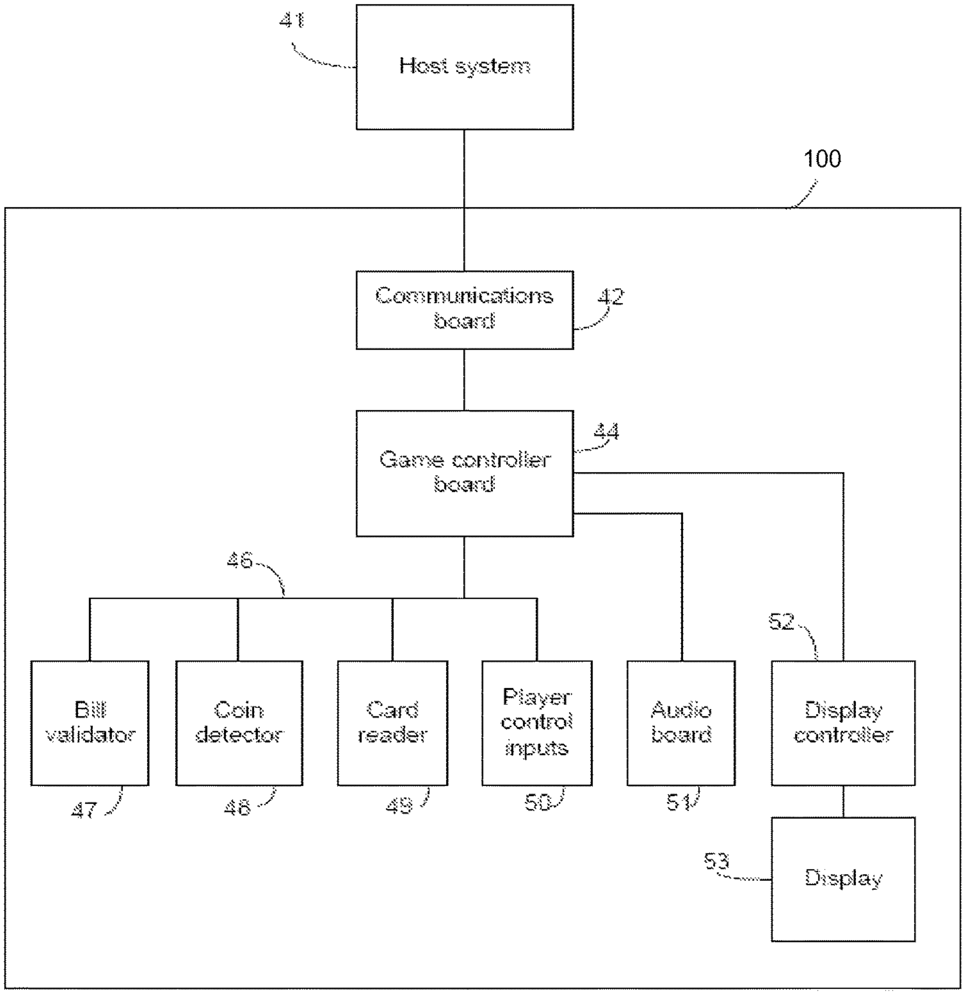
FIG. 2 is a block diagram of a casino game machine linked to a casino’s host system in accordance with some embodiments.

FIG. 2 is a block diagram of an exemplary casino game machine 100 (such as may be housed in exemplary cabinet 10) linked to a casino's host system 41. In the example shown, a communications board 42 may contain circuitry for coupling the casino game machine 100 to a local area network (LAN) and/or other type of network using any suitable protocol, such as the G2S protocols. Internet protocols are typically used for such communication under the G2S standard, incorporated herein by reference. Communications board 42 may transmit using a wireless transmitter, and/or may be directly connected to a network running throughout the casino floor. Communications board 42 may set up a communication link with a master controller and may buffer data between the network and game controller board 44. Communications board 42 may also communicate with a network server, such as in accordance with the G2S standard, for exchanging information to carry out embodiments described herein.

Game controller board 44 may contain memory and one or more processors for carrying out programs stored in the memory and for providing the information requested by the network. Game controller board 44 may execute programs stored in the memory and/or instructions received from host system 41 to carry out game routines.

Peripheral devices/boards may communicate with game controller board 44 via a bus 46 using, for example, an RS-232 interface. Such peripherals may include a bill validator 47, a coin detector 48, a smart card reader and/or other type of credit card reader 49, and/or player control inputs 50 (such as buttons 39 and/or a touch screen).

Game controller board 44 may also control one or more devices that produce the game output including audio and video output associated with a particular game that is presented to the user. For example, audio board 51 may convert coded signals into analog signals for driving speakers. Display controller 52 may convert coded signals into pixel signals for one or more displays 53 (e.g., display 12 and/or display 14). Display controller 52 and audio board 51 may be directly connected to parallel ports on game controller board 44. In some embodiments, the electronics on the various boards may be combined in any suitable way, such as onto a single board.

Figure 3:
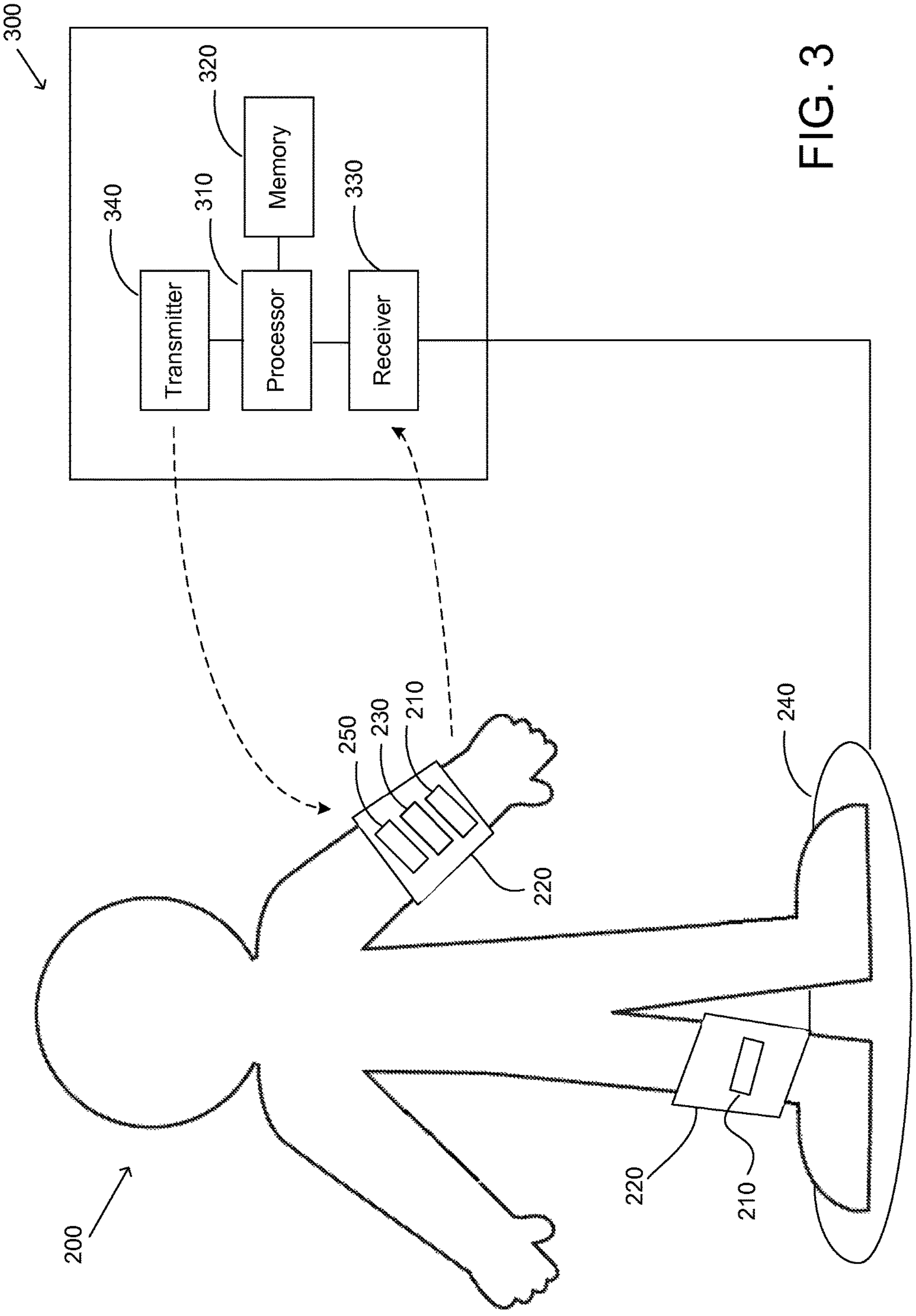
FIG. 3 illustrates some exemplary functionality of a control system for a casino game machine in accordance with some embodiments.

FIG. 3 illustrates an exemplary control system 300 that may be used in some embodiments to control a casino game machine, such as exemplary casino game machine 100, in one or more aspects. Control system 300 may be implemented in any suitable form, as embodiments are not limited in this respect. For example, control system 300 may be implemented as a single stand-alone machine, or may be implemented by multiple distributed machines that share processing tasks in any suitable manner. Control system 300 may be implemented as one or more computers; an example of a suitable computer is described below. In some embodiments, control system 300 may include one or more tangible, non-transitory processor-readable storage devices storing processor-executable instructions, and one or more processors that execute the processor-executable instructions to perform the functions described herein. The storage devices may be implemented as computer-readable storage media (i.e., tangible, non-transitory computer-readable media) encoded with the processor-executable instructions; examples of suitable computer-readable storage media are discussed below. An example of a suitable storage medium is memory 320 depicted in FIG. 3, which is operatively connected to processor 310 for executing instructions stored in memory 320. In one example, processor 310 and memory 320 may be a processor and memory contained in game controller board 44, which may provide functionality for operating one or more games on casino game machine 100, in addition to providing control functionality described herein. In another example, processor 310 and/or memory 320 may be separate from game controller board 44 and may assert control signals upon game controller board 44 for affecting the operation of game controller board 44 in operating one or more games on casino game machine 100. When components of control system 300 are separate from components of casino game machine 100 described above, the components of control system 300 may be housed in any suitable location in any suitable configuration, within and/or attached to cabinet 10 and/or separated therefrom.

Exemplary control system 300 includes one or more receivers 330 for receiving data from one or more sensors 210 worn by a player 200. Sensors 210 may be configured to transmit data, and receiver 330 may be configured to receive the transmitted data, in any suitable form, as embodiments are not limited in this respect. In some embodiments, sensors 210 may be configured to encode measurement data in an electronic signal, and to transmit the encoded signal via wired and/or wireless communication to receiver 330 for processing by processor 310. In some embodiments, receiver 330 may be mounted on cabinet 10 housing processor 310 and other components of casino game machine 100. In other embodiments, receiver 330 (and processor 310) may be separately housed and may receive signals from sensors 210 at a different location while player 200 interacts with casino game machine 100.

In some embodiments, sensors 210 may be configured to detect voluntary muscle activity of player 200 while player 200 is playing a wagering game on casino game machine 100. As used herein, the term "voluntary" muscle activity refers to movement of skeletal muscles under voluntary control by the somatic nervous system, as distinguished from involuntary muscle activity such as breathing and heartbeat, which is controlled by the autonomic (involuntary) nervous system. Voluntary muscle activity may include conscious movement, such as deliberate gestures, as well as unconscious (but still voluntary) movements that occur without deliberate intention, such as unconscious weight shifting, fidgeting, foot tapping, etc.

Sensors 210 may be configured to detect a player's voluntary muscle activity in any suitable way, as embodiments are not limited in this respect. In some embodiments, a sensor 210 may be configured to use electromyography (EMG) to detect electrical activity produced by the player's muscles when they are activated for a voluntary movement. In some cases, even before the actual movement takes place, the initial electrical stimulus to the muscle may be detected and interpreted to control the casino game machine. In some embodiments, one or more sensors 210 may be integrated into a wearable device 220, such as an armband or a legband, that may maintain the sensor(s) 210 in contact with an area of the player's body while the device 220 is worn. Such a wearable device 220 could alternatively be incorporated into an article of clothing or an accessory such as a watch, a ring, glasses, etc. In some embodiments, any suitable motion detection component 230, such as one or more accelerometers, may also be incorporated into wearable device 220 to measure the motion of device 220 through space as player 200 moves the portion of his/her body on which device 220 is worn. In some embodiments, muscle activity sensor 210 and/or motion detector 230 may be configured to transmit measured muscle activity and/or motion data to receiver 330 for processing by processor 310. In other embodiments, muscle activity sensor 210 and/or motion detector 230 may be configured to perform some preprocessing on the measured data before transmission to receiver 330, such as by mapping the measured data to one or more known gestures and then transmitting identification of the recognized gestures to receiver 330 for further processing by processor 310. In some embodiments, wearable device 220 may use technological mechanisms provided by the gaming device to charge its energy storage.

In some embodiments, wearable device 220 may be presented to player 200 as an appealing interface for interacting with casino game machine 100, e.g., as a replacement for and/or an augmentation to buttons 39 or a touchscreen affixed to cabinet 10. For example, in some embodiments, a set of control gestures may be made available by which player 200 may input commands to casino game machine 100 by moving a portion of his/her body, such as an arm or a hand, wearing device 220, through space. In one example, for instance, when casino game machine 100 is a slot machine, one possible control gesture may be for player 200 to pull down on an imaginary or real arm of the slot machine (e.g., moving the player's arm and/or hand downward) to begin a spin of the reels.

Muscle activity data collected by sensor 210 and/or motion data collected by motion detector 230 during the player's movement may be transmitted to receiver 330 and then analyzed by processor 310 to recognize the corresponding control gesture. Alternatively, one or more processing components within wearable device 220 may analyze the detected muscle activity and/or motion data internally to recognize the control gesture, and an identification of the recognized control gesture may be transmitted to receiver 330. Processor 310 may then map the recognized control gesture to the appropriate action within the wagering game, e.g., by querying a lookup table of control gestures and their associated user input commands stored in memory 320 or another suitable storage medium for the wagering game being played. In this example, the table stored in memory 320 for the slot machine game being played by player 200 may have an entry for the downward arm movement control gesture, corresponding to an input command to spin the reels. Having retrieved the appropriate input command, processor 310 may then assert the command to cause casino game machine 100 to begin a reel spin.

Any suitable set of control gestures may be programmed into control system 300 to cause execution of any suitable set of input commands, as embodiments are not limited in this respect. Some non-limiting examples of suitable pairings of control gestures to input commands may include: snapping fingers to begin a game, tapping a foot on the floor to begin a game, tapping the game cabinet with a finger to begin a game, swiping a hand horizontally to navigate through a selection menu, rotating a first to the right or left to navigate to the right or left in an onscreen menu, pushing a hand forward to input a mouse click or button selection, closing an open hand to a first and pushing the first forward to select an asset and zoom out, rotating a palm to the right or left to adjust the audio volume, holding up a predefined combination of one or more fingers to modify the bet per game, to modify the paylines played, to select numbers of freegames, etc., moving a hand to manipulate a virtual object in an interactive bonus game, drawing a circle in the air to leave a game for the game selection menu, touching a reel on a video screen to stop the reel from spinning, moving the hand as if to turn a wheel on a video screen to start the wheel turning, touching areas on a video screen to execute selections or de-selections (e.g., of buttons, playing cards, etc.), sliding a hand over a video screen to move a fader or to switch from one information page to another, and/or any other suitable mappings of any suitably defined control gestures to any suitable input commands. It should be appreciated that the foregoing are merely examples, and embodiments are not limited to the inclusion of any exemplary control gesture discussed herein.

In some embodiments, a wearable device 220 may include multiple sensors 210, and/or player 200 may wear multiple devices 220 each including one or more sensors 210, to collect muscle activity data from multiple muscles that may interact to perform one or more defined control gestures. Devices 220 may be worn on any suitable part(s) of the body, such as an arm, a wrist, a hand, a finger, a leg, an ankle, a neck, on the face, etc., to detect activity in one or more muscles in that part of the body. In some embodiments, devices 220 may communicate with each other, or with an external device such as processor 310 (e.g., via receiver 330), to aggregate and analyze muscle activity data from multiple sensors 210 to recognize a control gesture performed using multiple muscles.

In some embodiments, instead of or in addition to merely detecting whether a muscle is activated or not, a muscle activity sensor 210 may collect data on one or more intensity parameters and may transmit such intensity data to receiver 330 for analysis by processor 310. For example, in some embodiments, muscle activity sensor 210 may provide data on the amplitude of EMG measurements (e.g., expressed in mV) or may express the strength of the muscle activity (e.g., the level of electrical activity measured) in terms of a predefined range of intensity (e.g., on a scale from 0 to 10). In some embodiments, processor 310 may be programmed to analyze such intensity parameters in determining the appropriate input command to which to map the associated control gesture. In one example, for instance, a control gesture of pressing the thumb and forefinger together may be defined for adjusting the audio output volume level of the casino game machine, and the strength of the muscle activity in performing the control gesture may be interpreted to determine the specific volume level to set. Other parameters may alternatively or additionally be used to vary the manner in which control gestures are mapped to particular commands or parameters of commands, such as by the speed at which the control gesture is performed, the size of the gesture (e.g., the distance travelled by the player's arm or other part of the body), or the context of a particular control gesture being preceded or followed by, or co-occurring with, one or more other gestures.

In some embodiments, in addition to or in lieu of inputting commands via control gestures, voluntary muscle activity detected by sensors 210 may be analyzed by processor 310 to infer the player's emotional state while playing the wagering game on casino game machine 100. This may be done in any suitable way. In one example, processor 310 may be programmed to process the detected voluntary muscle activity (e.g., through execution of program instructions stored in memory 320) to extract one or more patterns corresponding to known emotional states. Such patterns may be identified, for example, by rule-based algorithms defined by one or more human experts, and/or by statistical modeling based on training data, as discussed further below. In some embodiments, a set of known emotional states and corresponding types of voluntary muscle activity to monitor may be defined based at least in part on their relevance to determining a player's level of engagement with a wagering game. For example, if a player is clapping his/her hands in excitement, rubbing a part of cabinet 10 for good luck, or gesticulating wildly in anticipation or suspense, these emotional states may be associated with an inference that the player is feeling engaged and entertained (and likely will continue to play and wager). On the other hand, if a player is throwing his/her hands up in disappointment, or is often turning his/her wrist to look at his/her watch in boredom, these emotional states may be associated with an inference that the player is feeling frustrated or is losing interest (and is at risk of slowing or ceasing his/her playing and wagering).

In some embodiments, processor 310 may access information stored in memory 320 to map the player's emotional state inferred from the player's detected voluntary muscle activity to one or more game adjustments appropriate for increasing the likelihood that the player (in that inferred emotional state) will continue to play the wagering game he/she is currently playing or another wagering game (e.g., within the same casino). The mapping of known emotional states to appropriate game adjustments stored in memory 320, and consulted by processor 310, may be implemented in any suitable form, such as in one or more look-up tables, one or more decision trees, and/or any other suitable form of mapping. In some embodiments, there may be different mappings of known emotional states to appropriate game adjustments for different wagering games or types of wagering games, and/or for different players or types of players. For example, different types of game adjustments may be deemed appropriate for regaining the interest of a female player who seems to be becoming tired or bored vs. a male player who seems to be becoming tired or bored, or for an older player vs. a younger player, or for the combination of an older female player vs. a younger male player, etc.

Any suitable game adjustments may be defined as appropriate for increasing the likelihood that the player in the inferred emotional state will continue to play the current wagering game or another wagering game. Such game adjustments may be defined, for example, by one or more human experts, or through automated or semi-automated analysis of observed player reactions to past game adjustments, as discussed further below. Some non-limiting examples of possible adjustments for a slot machine game may include video output adjustments (e.g., color and/or contrast enhancements, altered graphic content, animations, reel spinning speed adjustments and/or visual effects, etc.), audio output adjustments (e.g., volume adjustments, sound effects, added music, tempo adjustments, crowd noise simulation, etc.), adjustments to the pay lines, adjustments to the wagering criteria, adjustments to the pay table, providing bonus games, tactile stimuli, etc. Having identified one or more game adjustments appropriate for the player's inferred emotional state, processor 310 may apply the identified game adjustment(s) in some embodiments by changing one or more operating parameters of the casino game machine controlling one or more aspects of the wagering game accordingly while the player is playing the wagering game.

In some embodiments, the detected muscle activity analyzed to infer the player's emotional state may include the player's voluntary muscle activity used to input commands to the casino game machine via control gestures as discussed above. In this way, at least some of the player's muscle activity data provided to sensor 210 may serve the dual purpose of inputting control commands to the casino game machine while also providing information from which to infer the player's emotional state. Advantageously, the player in many cases need not be fully aware that an additional function of wearable device 220 with muscle activity sensor 210 (in addition to allowing for possibly touchless control gestures) is to provide the voluntary muscle activity information for analysis to infer the player's emotional state.

When data on one or more intensity parameters are supplied by sensor 210, in some embodiments such intensity parameters may be analyzed as part of inferring the player's emotional state. Such intensity parameters may include, for example, the speed, distance, duration, acceleration, repetition, frequency, escalation, etc., of a control gesture. For example, a player using more intense control gestures in some cases may be inferred to be in an engaged emotional state, while a player using less intense control gestures might be inferred to be losing interest.

In some embodiments, in addition to or in lieu of analyzing conscious voluntary muscle activity, processor 310 may be configured to analyze the player's unconscious movement to infer the player's emotional state. For example, voluntary muscle activity associated with unconscious movements such as shifting weight from one leg to another, tapping fingers or feet, fidgeting in various ways, looking distractedly around the room, etc., could be analyzed to extract patterns leading to inferences that the player is becoming more or less engaged in the wagering game.

In some embodiments, the player's voluntary movements may alternatively or additionally be monitored in other ways than through muscle activity sensors 210, to collect information from which to infer the player's emotional state.

FIG. 3 depicts, for example, a pressure-sensitive surface 240 which may be used to detect weight-shifting movements by player 200. In another example, sensors may be incorporated into elements of cabinet 10, such as buttons 39 and/or display screen 12, to detect the force with which player 200 inputs commands, makes selections, etc., through touch.

In some embodiments, as illustrated in FIG. 3, a wearable device 220 may include one or more transducers 250 for delivering tactile stimuli, such as electrical and/or vibration stimuli, to player 200. In some embodiments, such stimuli may be delivered as part of the game play, such as to enhance the player's experience of an event occurring on the visual display during the game. For example, tactile stimuli could be provided to get the player's attention in the case of high wins or special game states. In some embodiments, tactile stimuli may be provided to enhance the player's experience of providing control gestures, such as by providing feedback when a movement successfully registers as a recognized control gesture. Alternatively or additionally, in some embodiments, tactile stimuli may be provided as game adjustments determined for the player's current emotional state, to increase the likelihood that the player will continue to play. In one example, for instance, appropriate patterns of tactile stimuli may be provided to create a state of relaxation or positive emotion in the player. In some embodiments, tactile stimuli may be provided via transducer 250 in response to instructions transmitted to wearable device 220 by transmitter 340 in control system 300.

Alternatively or additionally, in some embodiments, processor 310 may be configured to map the player's inferred emotional state to one or more actions, other than game adjustments, to be performed with the object of increasing the likelihood that the player will continue to play wagering games. Some examples of suitable actions include making environmental adjustments, such as adjustments to the lighting in the room around the player and the casino game machine, adjustments to the oxygen level in the surrounding air, injecting one or more fragrances into the surrounding air, adjustments to music and/or other sounds played in the room, etc. Other examples of suitable actions include presenting one or more promotional offerings to the player, such as restaurant and/or bar discounts, tickets to entertainment venues, free credits for wagering games, discounts to tourist attractions, etc. It should be appreciated that the foregoing are merely examples, and that any suitable actions may be defined for increasing the likelihood that a player will continue to play wagering games in accordance with some embodiments.

In some embodiments, as discussed above, a mapping of known emotional states to appropriate actions, such as game adjustments, may be specifically tailored to a particular player or to a particular type (or group, or category) of player. In some embodiments, control system 300 may incorporate a learning component (e.g., through suitable programming instructions stored in memory 320 and executable by processor 310) to develop and/or refine such a tailored mapping. For example, in some embodiments, player 200 may be uniquely identified while playing a wagering game on casino game machine 100, such as by an identification code unique to the player's wearable device 220, or by personal identifying information entered into casino game machine 100 by player 200. In some embodiments, while player 200 is playing the wagering game and the player's voluntary muscle activity is being detected and analyzed to infer the player's emotional state, control system 300 may match the player's emotional states to game events and/or adjustments that occurred in temporal relation to the emotional states. In some embodiments, this information may be stored in association with the player's identification information, and in some embodiments the information of which events and/or adjustments gave rise to which emotional states may be used to update the mapping of which adjustments are appropriate for maintaining or increasing the player's engagement level when in various emotional states. In some embodiments, such learning may be performed to update a mapping for a particular group of players (such as a particular gender, age group, ethnicity, marital status, geographical background, and/or any other suitable grouping or combination), e.g., by aggregating observed data from players belonging to that group. In this respect, in some embodiments, player 200 need not be uniquely identified while using casino game machine 100, but may alternatively or additionally be associated with one or more group(s) of players in any suitable way, such as by providing demographic information.

Figure 4:
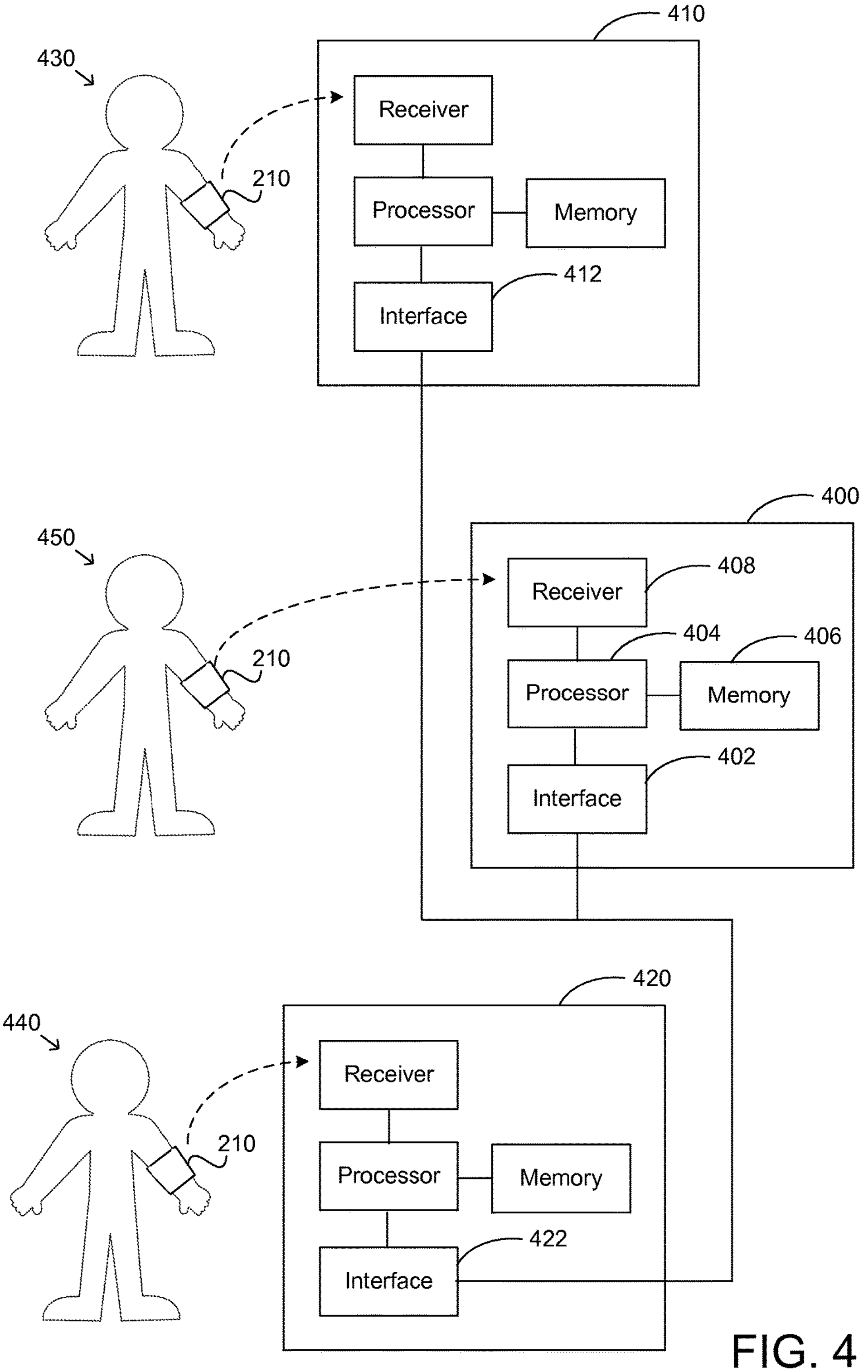
FIG. 4 illustrates an exemplary operating environment for a control system for casino game machines in accordance with some embodiments.

In some embodiments, data collected from multiple muscle activity sensors 210 worn by multiple players of wagering games may be analyzed to identify patterns of emotional responses to the wagering games across players, and to learn from those patterns. FIG. 4 illustrates an example of how this may be implemented, e.g., in a casino environment including a central control system 400 having an interface 402 for wired and/or wireless communication with casino game machines 410 and 420 (and possibly other casino game machines) via their respective interfaces 412 and 422. Central control system 400 includes one or more processors 404 and memory 406 (e.g., one or more processor-readable storage media) storing processor-executable instructions for causing processor 404 to perform functions such as transmitting control commands to casino game machines 410 and 420. For example, central control system 400 may, through execution by processor 404 of stored program instructions, stream game content to casino game machines 410 and 420 and/or instruct casino game machines 410 and 420 to implement game adjustments selected by central control system 400 at times determined by central control system 400. In some cases, central control system 400 may select appropriate game adjustments for casino game machines 410 and 420 based on analysis of voluntary muscle activity detected from players 430 and 440 (and possibly other players), using techniques discussed above.

In some embodiments, central control system 400 may receive detected voluntary muscle activity for players 430 and 440 from casino game machines 410 and 420. That is, each player's voluntary muscle activity may be received at the casino game machine with which the respective player is interacting, and then the detected muscle activity may be forwarded from the casino game machine to central control system 400 for processing, and/or the casino game machine may perform its own local processing and then forward inferred emotional states to central control system 400 for further processing. Alternatively or additionally, central control system 400 may include its own receiver 408 by which it may receive signals directly from sensors 210 worn by player 430 and/or player 440, and/or by any other person within range, such as spectator 450. In some embodiments, central control system 400 may process the data it receives from any of these various sources, to infer emotional states of any sensor wearers of interest, and/or to select one or more appropriate game adjustments and/or other actions appropriate for increasing the likelihood that people will play wagering games. In alternative embodiments, multiple casino game machines may communicate with each other and collectively process data, with or without the involvement of a central control system.

For example, in some embodiments, one or more game adjustments applied to a casino game machine on which a first player is playing a wagering game may be selected based not only on that first player's inferred emotional state, but also or instead based on the inferred emotional state of one or more other players, spectators, and/or other people in the vicinity. For example, if player 430 becomes excited by a particular event that occurs in a game he is playing on casino game machine 410, this could be a trigger to apply an appropriate game adjustment to casino game machine 420 to create a similar event with the object of creating similar excitement in player 440. In another example, the emotional response of spectator 450 while watching player 430 play a game on casino game machine 410 may be used as a trigger for one or more appropriate game adjustments to be applied to casino game machine 410, to make the game more exciting to player 430 as gauged by the reactions of spectator 450, and/or to make the game more enticing to spectator 450 with the object of inducing spectator 450 to become a player. In some embodiments, alternatively or additionally, the emotional states of multiple wearers of sensors 210 (e.g., as inferred from their muscle activity) may be used to select actions having a group effect, such as game adjustments to apply to a multiplayer game, or environmental adjustments having general effect on a room of people.

In some embodiments, data collected from multiple wearers of muscle activity sensors 210 may be used as training data for learning associations between patterns of muscle activity and various emotional states, and/or between various emotional states and game adjustments and/or other actions appropriate for increasing the likelihood that people in those emotional states will play wagering games. For example, in some embodiments, measured muscle activity data may be aggregated and stored, so that statistical models can be trained on past data to recognize patterns of muscle activity associated with various emotional states. Such associations may be learned for players/people in general, for specific individual players, and/or for specific groups. In some embodiments, data aggregated over time, as game adjustments and/or other actions are applied and muscle activity data is collected and associated with various emotional states, may be processed to identify patterns of emotional responses that follow particular adjustments. The set(s) of available adjustments and/or the mappings of adjustments to triggering emotional states may then be updated based on the patterns of emotional responses identified from the collected information. Also, in some embodiments, behavior models may be created from stored data regarding voluntary muscle movements, such that a player's action may be predicted from a recent series of actions, and the game experience may be modified based on the prediction.

Figure 5:
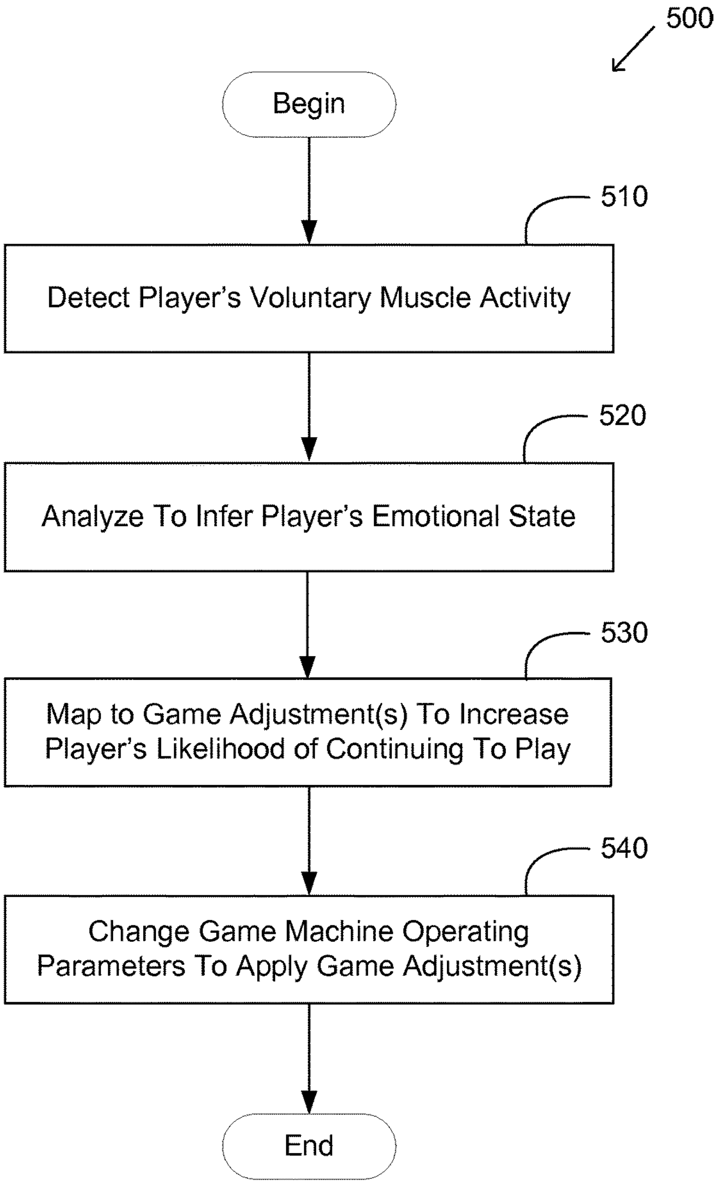
FIG. 5 is a flowchart illustrating an exemplary method for controlling a casino game machine in accordance with some embodiments.

It should be appreciated from the foregoing that one embodiment is directed to a method 500 for controlling a casino game machine, as illustrated in FIG. 5. Method 500 may be performed, for example, by one or more components of a control system 300 such as processor 310, although other implementations are possible, as method 500 is not limited in this respect. Method 500 begins at act 510, at which a player's voluntary muscle activity may be detected while the player is playing a wagering game on the casino game machine. As discussed above, in some embodiments such voluntary muscle activity may be detected via one or more muscle activity sensors worn by the player while playing the wagering game. At act 520, the detected voluntary muscle activity may be analyzed to infer the player's emotional state while playing the wagering game. At act 530, the inferred emotional state of the player may be mapped to one or more game adjustments appropriate for increasing the likelihood that the player in the inferred emotional state will continue to play the wagering game or another wagering game. Method 500 ends at act 540, at which one or more operating parameters of the casino game machine controlling one or more aspects of the wagering game may be changed to apply the identified game adjustments while the player is playing the wagering game.

Figure 6:
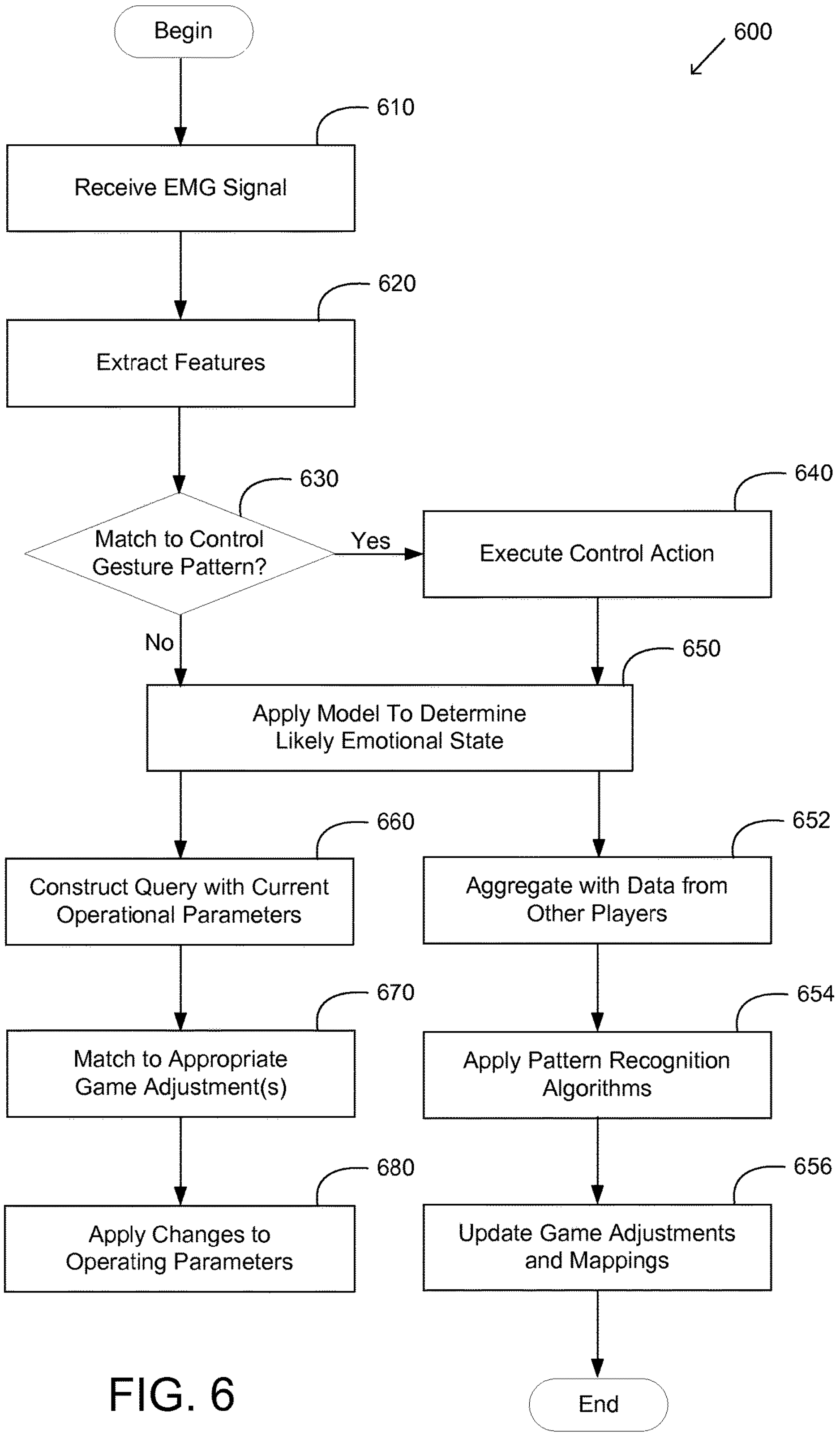
FIG. 6 is a flowchart illustrating another exemplary method for controlling a casino game machine in accordance with some embodiments.

As another example, FIG. 6 illustrates a more extensive method 600 for controlling a casino game machine in accordance with some embodiments. Method 600 begins at act 610, at which an EMG signal representing a player's muscle activity may be received. At act 620, a set of features may be extracted from the signal for pattern matching. At act 630, a determination may be made as to whether the extracted feature pattern is a match to any pattern of a predefined control gesture. If so, the control action corresponding to the matched control gesture (e.g., the system's programmed response to the input command corresponding to the control gesture) may be executed at act 640. After executing the control action at act 640, or if there is no matching control gesture found at act 630, or following act 620 independently from making the determination of whether there is a matching control gesture, at act 650 one or more rule-based and/or statistical models may be applied to the extracted features to determine the player's likely emotional state. By these steps, for example, the player's detected voluntary muscle activity may be analyzed to infer the player's emotional state while playing a wagering game.

At act 660, a query may be constructed, incorporating the inferred emotional state of the player as well as relevant information about the current state of the casino game machine, such as the casino game machine's current operational parameters. At act 670, the query may be input to a mapping mechanism, such as a look-up table or a decision tree, to match the combination of input fields in the query with one or more game adjustments defined as appropriate for that input combination in the mapping mechanism. By these steps, for example, the player's inferred emotional state may be mapped to one or more game adjustments appropriate for increasing the likelihood that the player in the inferred emotional state will continue to play the wagering game or another wagering game. At act 680, the identified game adjustments may be applied by applying suitable changes to the casino game machine's operating parameters that control one or more aspects of the wagering game while it is played by the player. Method 600 may then loop back to act 610 to receive further EMG signals while the player continues to play.

In addition, having inferred the player's emotional state at act 650 based on his/her detected muscle activity, at act 652 this data may be aggregated with similar data collected from other players. At act 654, one or more pattern recognition algorithms may be applied to the aggregated data to obtain updated information regarding which game adjustments are appropriate for increasing the likelihood of continued wagering in players in which emotional states, and/or to obtain updated information regarding which game adjustments are likely to produce which emotional states in which players or types of players. At act 656, this learning may be used to update the set of available game adjustments and/or the mappings used in act 670.

Figure 7:
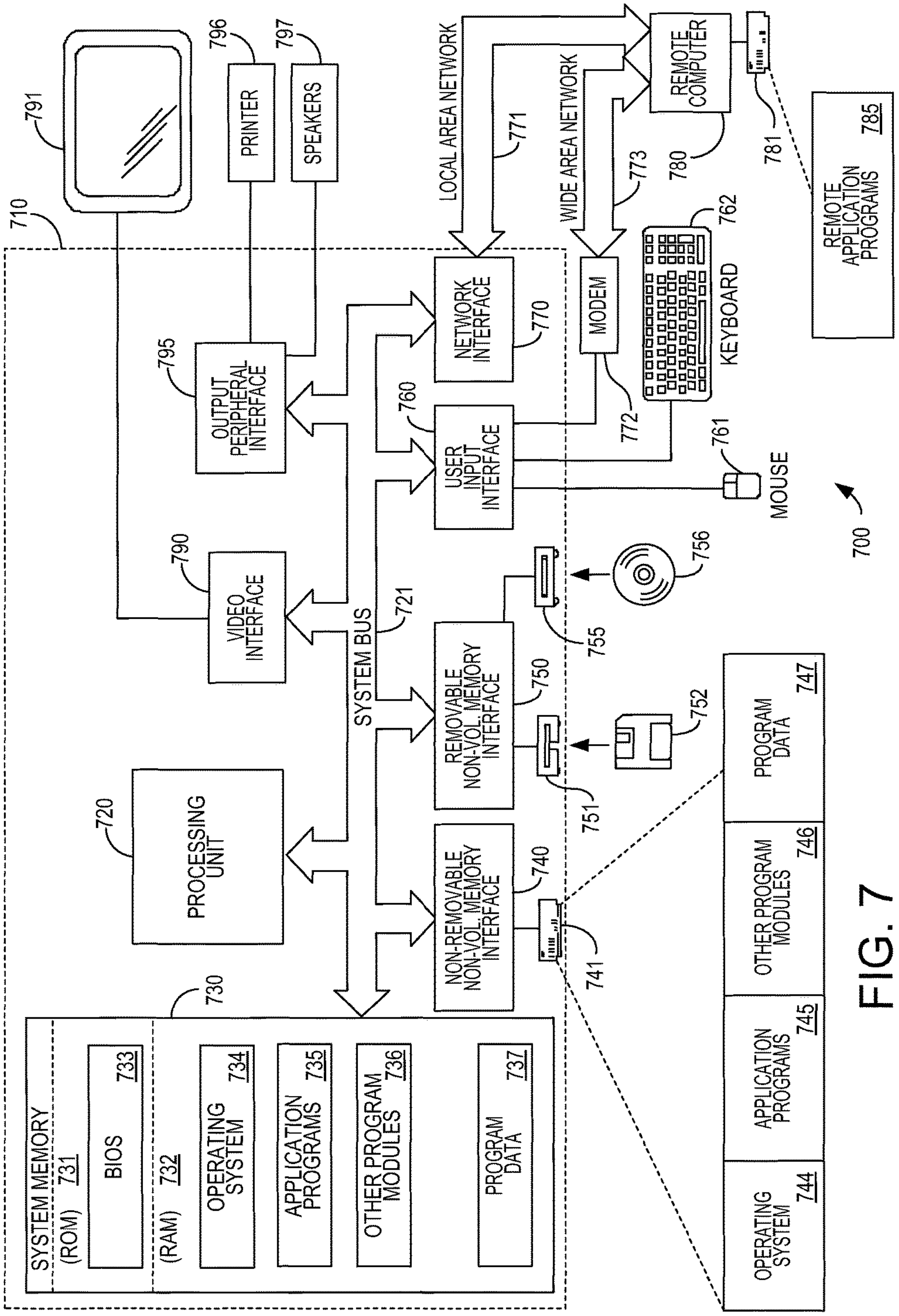
FIG. 7 is a schematic diagram of an exemplary computing environment in which some embodiments may be implemented.

FIG. 7 illustrates an example of a suitable computing system environment 700 in which some embodiments may be implemented. This computing system may be representative of a computing system that allows a suitable control system to implement the described techniques. However, it should be appreciated that the computing system environment 700 is only one example of a suitable computing environment and is not intended to suggest any limitation as to the scope of use or functionality of the described embodiments. Neither should the computing environment 700 be interpreted as having any dependency or requirement relating to any one or combination of components illustrated in the exemplary operating environment 700.

The embodiments are operational with numerous other general purpose or special purpose computing system environments or configurations. Examples of well-known computing systems, environments, and/or configurations that may be suitable for use with the described techniques include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc., that perform particular tasks or implement particular abstract data types. The embodiments may also be practiced in distributed computing environments where tasks are performed by remote processing devices that are linked through a communications network. In a distributed computing environment, program modules may be located in both local and remote computer storage media including memory storage devices.

With reference to FIG. 7, an exemplary system for implementing the described techniques includes a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7 provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 710 through input devices such as a keyboard 762 and pointing device 761, commonly referred to as a mouse, trackball or touch pad. Other input devices (not shown) may include a microphone, joystick, game pad, satellite dish, scanner, touchscreen, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation comprises at least one processor-readable storage medium (i.e., at least one tangible, non-transitory processor-readable medium, e.g., a computer memory (e.g., hard drive, flash memory, processor working memory, etc.), a floppy disk, an optical disc, a magnetic tape, or other tangible, non-transitory computer-readable medium) encoded with a computer program (i.e., a plurality of instructions), which, when executed on one or more processors, performs at least the above-discussed functions. The processor-readable storage medium can be transportable such that the program stored thereon can be loaded onto any computer resource to implement functionality discussed herein. In addition, it should be appreciated that the reference to a computer program which, when executed, performs above-discussed functions, is not limited to an application program running on a host computer. Rather, the term "computer program" is used herein in a generic sense to reference any type of computer code (e.g., software or microcode) that can be employed to program one or more processors to implement above-discussed functionality.

The phraseology and terminology used herein is for the purpose of description and should not be regarded as limiting. The use of "including," "comprising," "having," "containing," "involving," and variations thereof, is meant to encompass the items listed thereafter and additional items. Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described several embodiments of the invention, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method for controlling a casino game machine, the method comprising:

receiving credit information corresponding to cashless gaming;

detecting, via a voluntary muscle activity sensor corresponding to a player of a wagering game played on the casino game machine, voluntary muscle activity of the player while playing the wagering game on the casino game machine, the voluntary muscle activity comprising a control gesture made by the player to input a command to the casino game machine;

analyzing, by a processor, the detected voluntary muscle activity of the player to infer a state of the player indicative of the player's level of interest while playing the wagering game;

determining, by the processor, that the player's level of interest with the wagering game has decreased based on the detected voluntary muscle activity of the player;

changing, by the processor, an operating parameter of the wagering game to increase the interest of the player while the player is playing the wagering game;

collecting detected voluntary muscle activity information from multiple muscle activity sensors worn by multiple players of one or more wagering games; and analyzing the collected information to identify patterns of emotional responses to the one or more wagering games across players.

2. The method of claim 1, wherein detecting the voluntary muscle activity of the player comprises receiving from the muscle activity sensor, at a cabinet housing the casino game machine, a wireless signal encoding the voluntary muscle activity of the player while playing the wagering game.

3. The method of claim 1, further comprising analyzing the detected voluntary muscle activity of the player to identify the control gesture made by the player to input the command to the casino game machine.

4. The method of claim 1, wherein analyzing the detected voluntary muscle activity of the player to infer the state of the player comprises an intensity parameter of the detected muscle activity corresponding to the control gesture.

5. The method of claim 1, further comprising analyzing unconscious movement by the player to infer the state of the player.

6. The method of claim 1, wherein changing, by the processor, an operating parameter of the wagering game further comprises providing one or more tactile stimuli to the player via a device comprising the voluntary muscle activity sensor worn by the player.

7. The method of claim 6, wherein the one or more tactile stimuli comprise electrical and/or vibration stimuli.

8. The method of claim 1, further comprising updating the operating parameters of the game based on the patterns of emotional responses identified from the collected information.

9. The method of claim 1, further comprising mapping the inferred state of the player to one or more environmental adjustments appropriate for increasing the likelihood that the player in the inferred state will continue to play the wagering game or another wagering game.

10. The method of claim 1, further comprising mapping the inferred state of the player to one or more promotional offerings appropriate for increasing the likelihood that the player in the inferred state will continue to play the wagering game or another wagering game.

11. The method of claim 1, wherein inferring the player's state comprises inferring an emotional state of the player from the detected voluntary muscle activity.

12. The method of claim 1, further comprising:

collecting detected voluntary muscle activity information from multiple muscle activity sensors worn by at least one spectator of the one or more wagering games; and analyzing the collected information to identify patterns of emotional responses to the one or more wagering games across players and the at least one spectator.

13. At least one non-transitory processor-readable storage medium storing processor-executable instructions that, when executed by at least one processor, cause the processor to perform the following operations for controlling a casino game machine:

detecting, via a muscle activity sensor corresponding to a player of a wagering game played on the casino game machine, voluntary muscle activity of the player while playing the wagering game on the casino game machine, the voluntary muscle activity comprising a control gesture made by the player to input a command to the casino game machine;

analyzing the detected voluntary muscle activity of the player, including the control gesture made by the player to input the command to the casino game machine, to infer a state of the player indicative of the player's level of interest while playing the wagering game;

mapping the inferred state of the player to a game adjustment appropriate for increasing a likelihood that the player in the inferred state will continue to play the wagering game or another wagering game; and applying the game adjustment by changing an operating parameter of the casino game machine controlling an aspect of the wagering game while the player is playing the wagering game, wherein the operations performed by the processor further comprise collecting detected voluntary muscle activity information from multiple muscle activity sensors worn by multiple players of one or more wagering games, and analyzing the collected information to identify patterns of emotional responses to the one or more wagering games across players, and wherein analyzing the detected voluntary muscle activity of the player to infer the state of the player comprises analyzing an intensity parameter of the detected muscle activity corresponding to the control gesture.

14. The at least one non-transitory processor-readable storage medium of claim 13, wherein detecting the voluntary muscle activity of the player comprises detecting electrical muscle activity of the player while playing the wagering game.

15. The at least one non-transitory processor-readable storage medium of claim 13, wherein detecting the voluntary muscle activity of the player comprises receiving from the muscle activity sensor, at a cabinet housing the casino game machine, one or more wireless signals encoding the voluntary muscle activity of the player while playing the wagering game.

16. The at least one non-transitory processor-readable storage medium of claim 13, wherein the method further comprises analyzing the detected voluntary muscle activity of the player to identify the control gesture made by the player to input the command to the casino game machine.

17. The at least one non-transitory processor-readable storage medium of claim 13, wherein the operations performed by the processor further comprise analyzing unconscious movement by the player to infer the state of the player.

18. The at least one non-transitory processor-readable storage medium of claim 13, wherein applying the game adjustment further comprises providing a tactile stimuli to the player via a device comprising a muscle activity sensor worn by the player.

19. The at least one non-transitory processor-readable storage medium of claim 18, wherein the tactile stimuli comprise electrical and/or vibration stimuli.

20. The at least one non-transitory processor-readable storage medium of claim 13, wherein the operations performed by the processor further comprise updating the one or more game adjustments based on the patterns of emotional responses identified from the collected information.

21. The at least one non-transitory processor-readable storage medium of claim 13, wherein the operations performed by the processor further comprise mapping the inferred state of the player to one or more environmental adjustments appropriate for increasing the likelihood that the player in the inferred state will continue to play the wagering game or another wagering game.

22. The at least one non-transitory processor-readable storage medium of claim 13, wherein the operations performed by the processor further comprise mapping the inferred state of the player to one or more promotional offerings appropriate for increasing the likelihood that the player in the inferred state will continue to play the wagering game or another wagering game.

23. The at least one non-transitory processor-readable storage medium of claim 13, wherein inferring the player's state comprises inferring an emotional state of the player from the detected voluntary muscle activity.

24. A casino game machine comprising:

at least one processor; and at least one storage medium storing processor-executable instructions that, when executed by the at least one processor, cause the processor to perform the following operations for controlling the casino gaming machine:

receiving credit information corresponding to cashless gaming;

detecting, via a muscle activity sensor corresponding to a player of a wagering game played on the casino game machine, voluntary muscle activity of the player while playing the wagering game on the casino game machine, the voluntary muscle activity comprising a control gesture made by the player to input a command to the casino game machine;

analyzing the detected voluntary muscle activity of the player to infer a state of the player indicative of the player's level of interest while playing the wagering game;

mapping the inferred state of the player to a game adjustment that is appropriate for increasing a likelihood that the player in the inferred state will continue to play the wagering game or another wagering game;

applying the game adjustment by changing an operating parameter of the casino game machine controlling an aspect of the wagering game while the player is playing the wagering game;

collecting detected voluntary muscle activity information from multiple muscle activity sensors worn by multiple players of one or more wagering games; and analyzing the collected information to identify patterns of emotional responses to the one or more wagering games across players, wherein analyzing the detected voluntary muscle activity of the player to infer the emotional state of the player comprises analyzing an intensity parameter of the detected voluntary muscle activity corresponding to the one or more control gestures.

25. The casino game machine of claim 24, wherein detecting the voluntary muscle activity of the player comprises detecting electrical muscle activity of the player while playing the wagering game.

26. The casino game machine of claim 24, wherein detecting the voluntary muscle activity of the player comprises receiving from the muscle activity sensor, at a cabinet housing the casino game machine, a wireless signal encoding the voluntary muscle activity of the player while playing the wagering game.

27. The casino game machine of claim 24, wherein the operations performed by the processor further comprise analyzing the detected voluntary muscle activity of the player to identify the control gesture made by the player to input the command to the casino game machine.

28. The casino game machine of claim 24, wherein the operations performed by the processor further comprise analyzing unconscious movement by the player to infer the state of the player.

29. The casino game machine of claim 24, wherein applying the game adjustment further comprises providing a tactile stimuli to the player via a device comprising a muscle activity sensor worn by the player.

30. The casino game machine of claim 29, wherein the tactile stimuli comprise electrical and/or vibration stimuli.

31. The casino game machine of claim 24, wherein the operations performed by the processor further comprise updating the game adjustment based on the patterns of emotional responses identified from the collected information.

32. The casino game machine of claim 24, wherein the operations performed by the processor further comprise mapping the inferred state of the player to an environmental adjustment appropriate for increasing the likelihood that the player in the inferred state will continue to play the wagering game or another wagering game.

33. The casino game machine of claim 24, wherein the operations performed by the processor further comprise mapping the inferred state of the player to one or more promotional offerings appropriate for increasing the likelihood that the player in the inferred state will continue to play the wagering game or another wagering game.

34. The casino game machine of claim 24, wherein inferring the player's state comprises inferring an emotional state of the player from the detected voluntary muscle activity.

* * * * *